Oct. 31, 1939.  G. W. FINKE  2,177,644
DRILL SHARPENER
Filed July 26, 1937  7 Sheets-Sheet 1
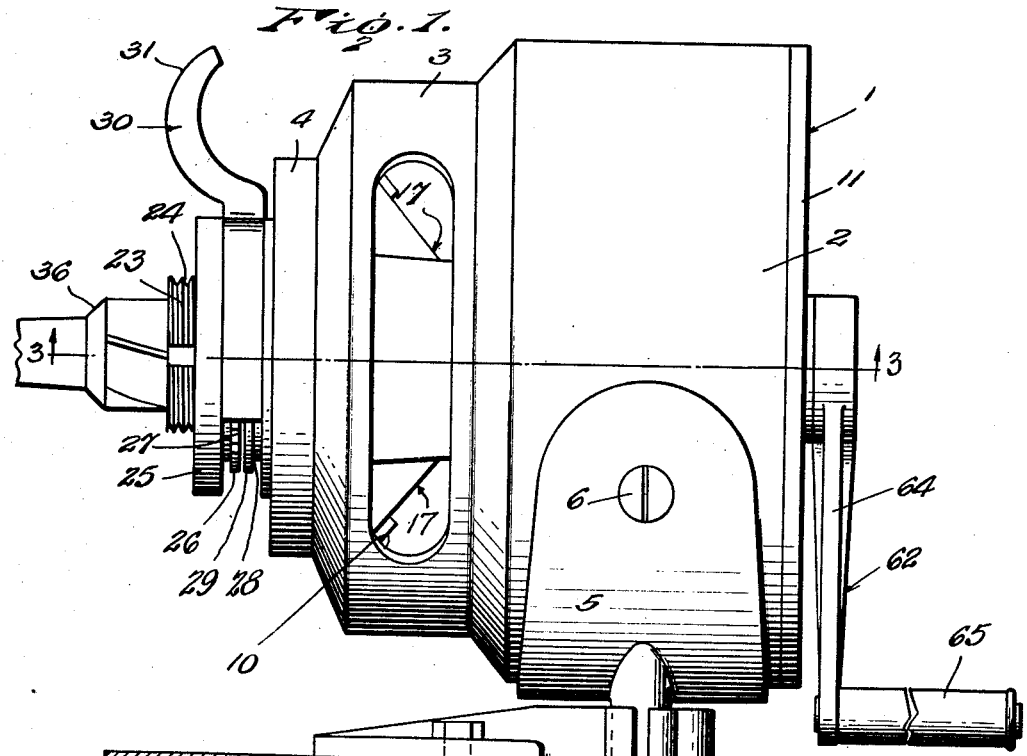
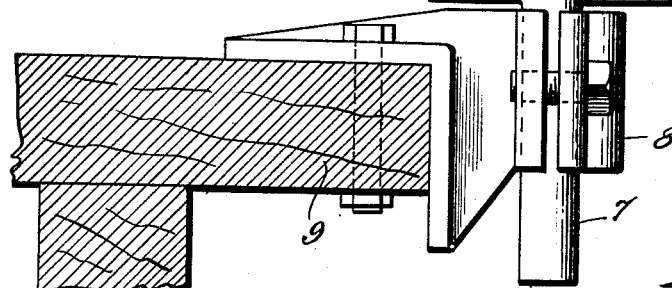
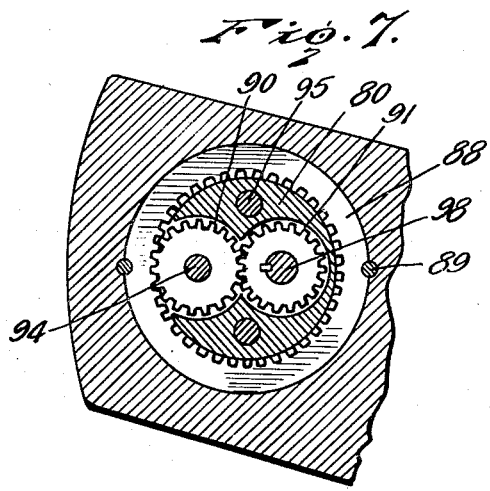
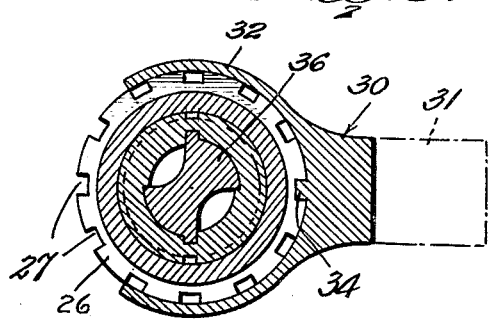
Inventor
George W. Finke.
By Lacey & Lacey,
Attorneys

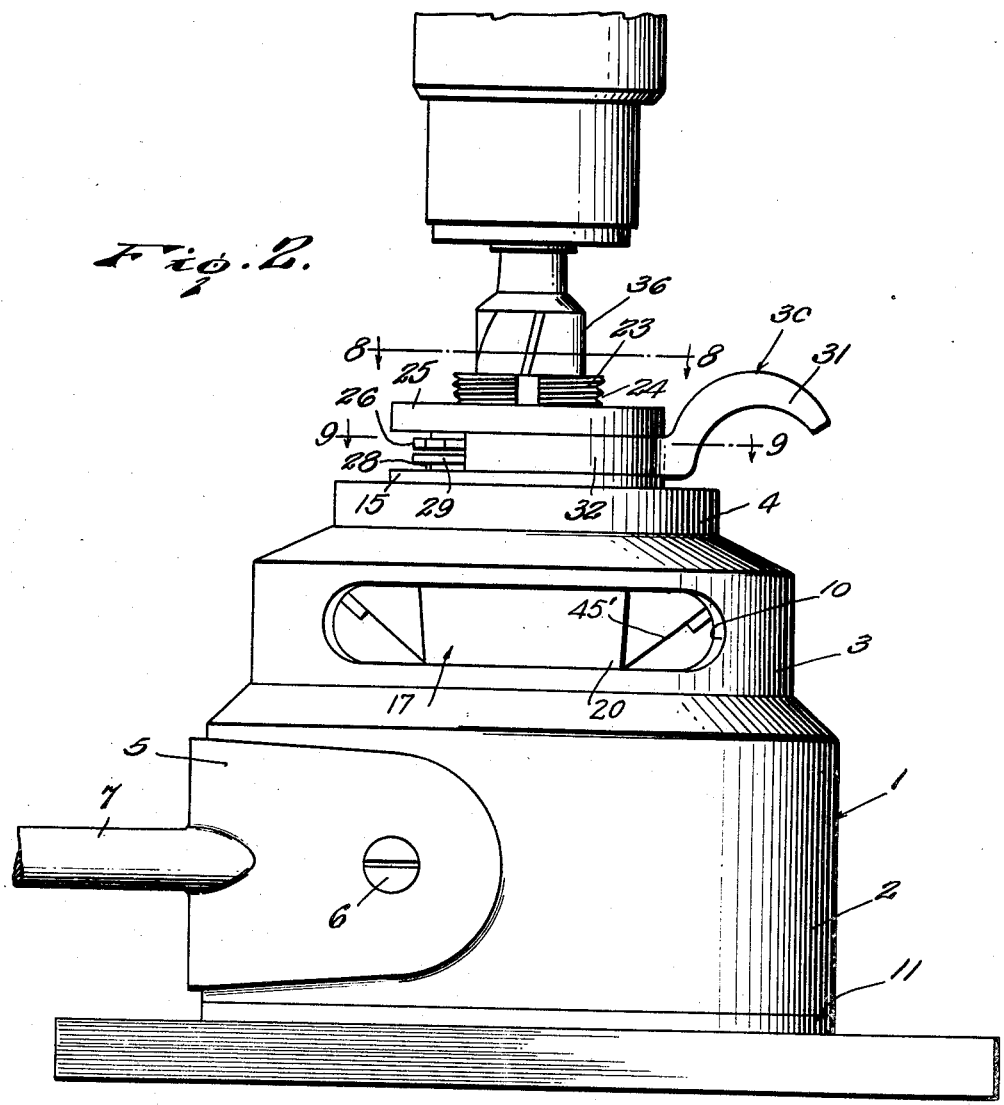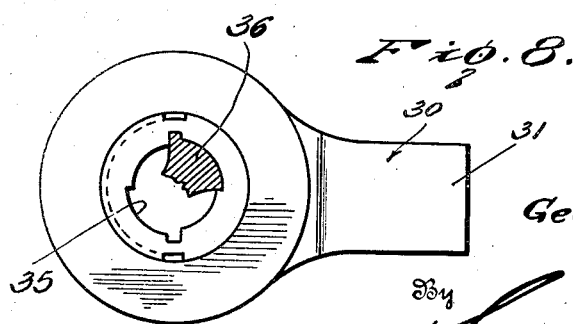

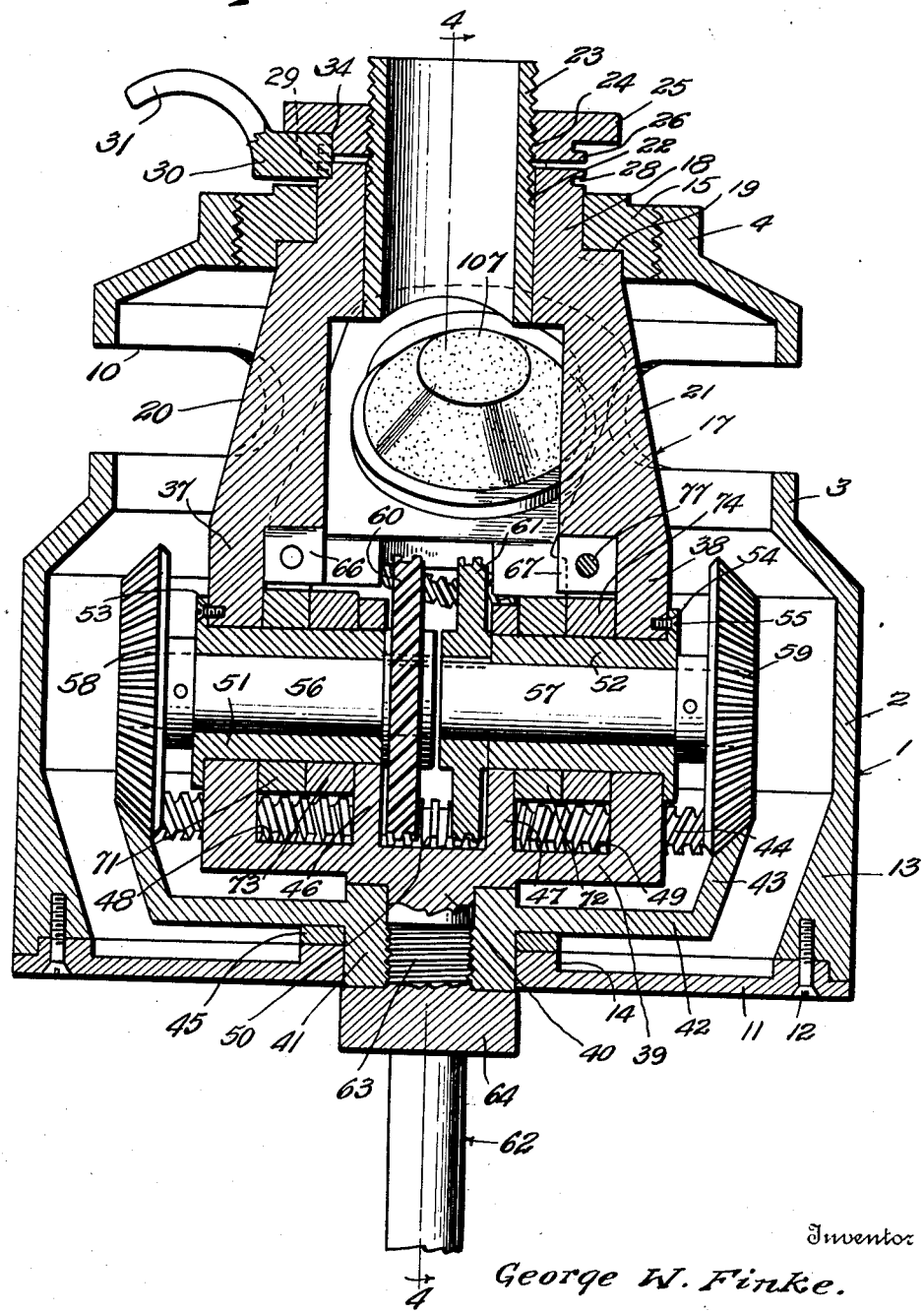

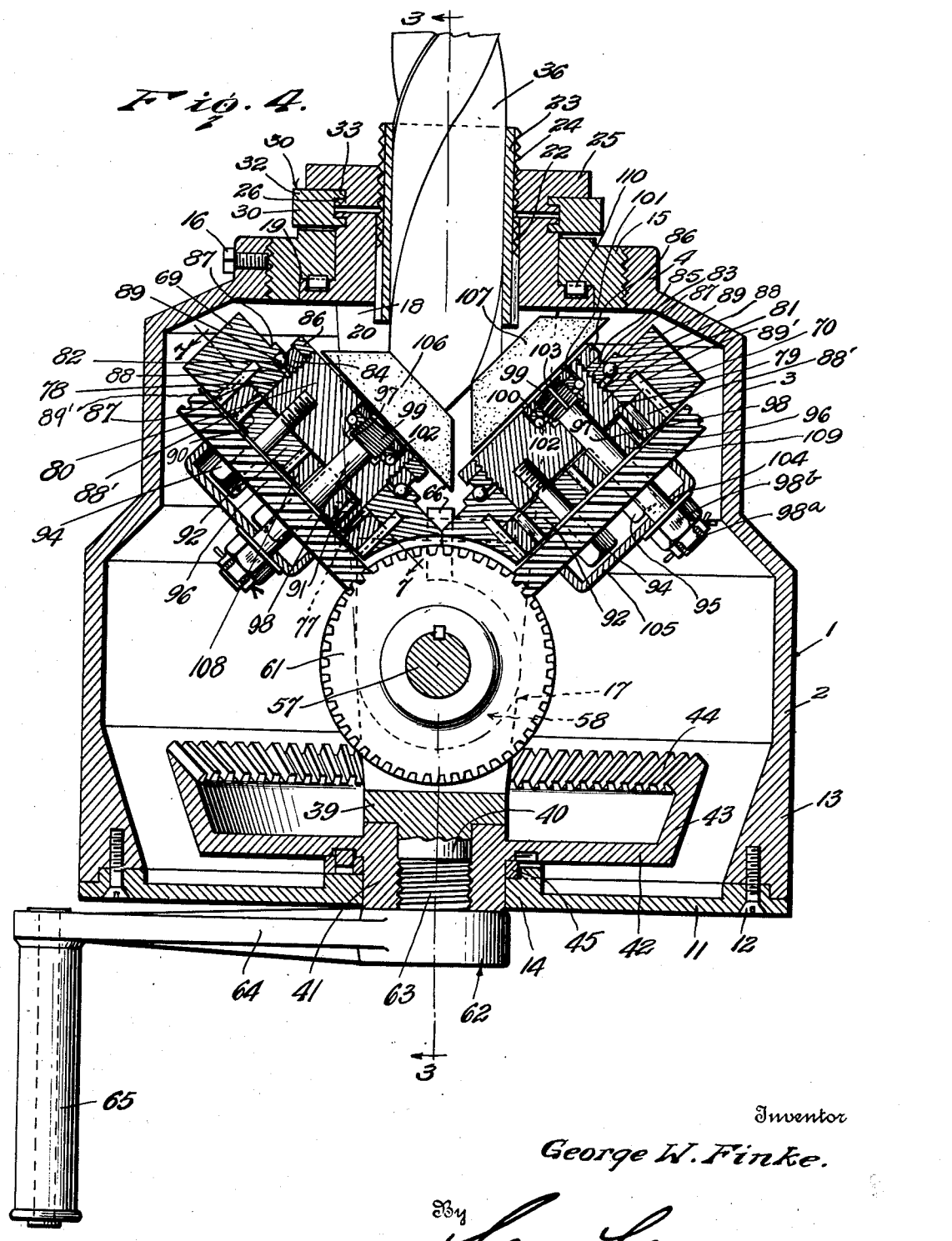

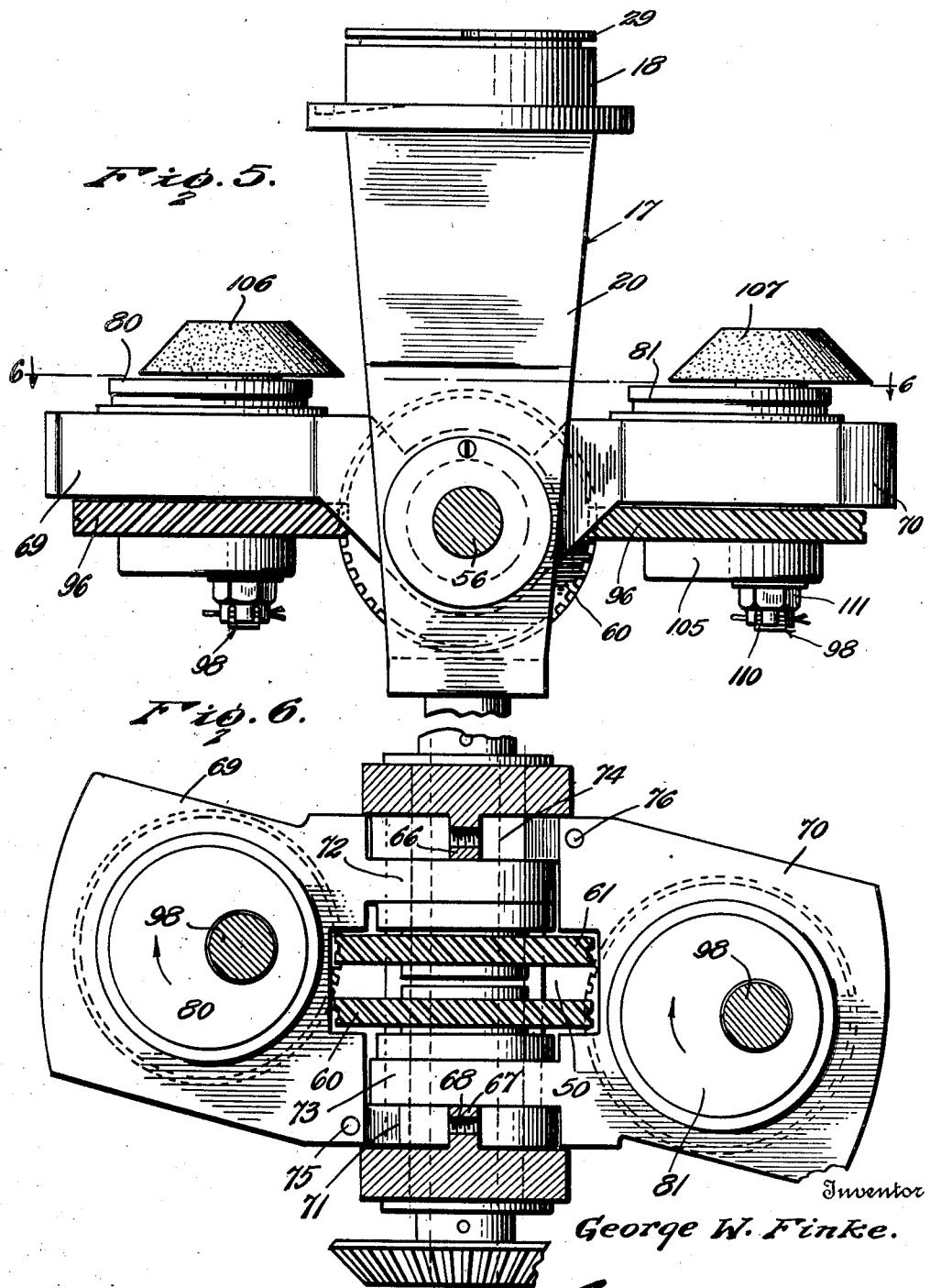

Oct. 31, 1939.  G. W. FINKE  2,177,644
DRILL SHARPENER
Filed July 26, 1937  7 Sheets-Sheet 6
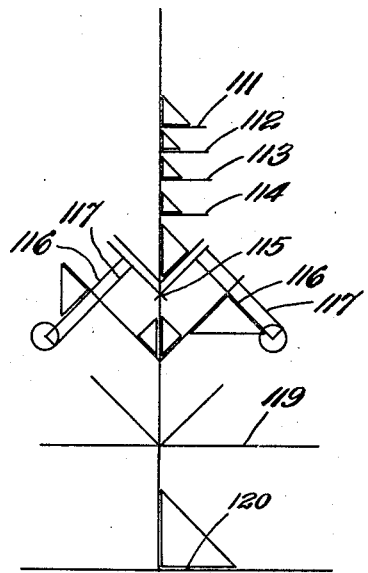
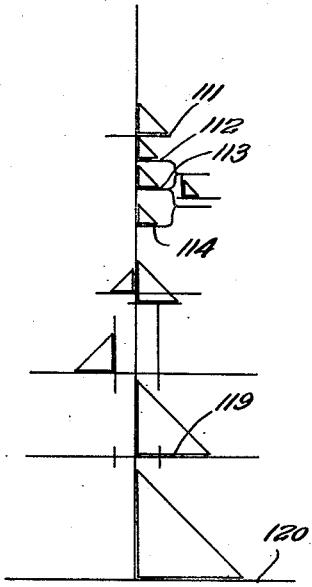
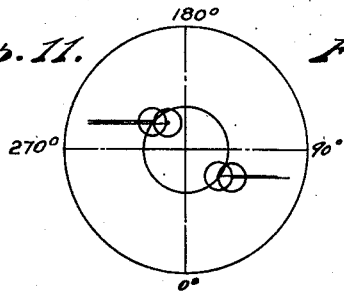
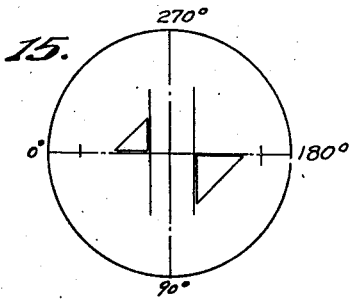
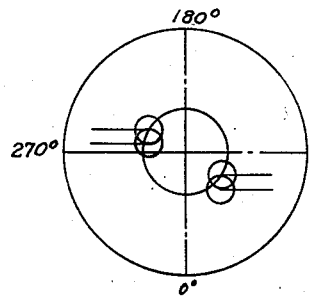
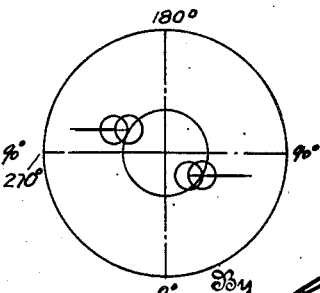
Inventor
George W. Finke.
By Lacey & Lacey,
Attorneys Inventor
George W. Finke.
By Lacey & Lacey
Attorneys Patented Oct. 31, 1939

2,177,644

UNITED STATES PATENT OFFICE 2,177,644

DRILL SHARPENER

George W. Finke, Moonachie Boro, N. J., assignor of forty-nine per cent to Bruno Concato, Moonachie Boro, N. J.

Application July 26, 1937, Serial No. 155,798

13 Claims. (Cl. 51—120)

This invention relates to an improved drill sharpener and is more particularly adapted for use in sharpening steel twist drills, straight steel drills, or other drills of similar nature.

One object of the invention is to provide a drill sharpener which will be automatic for producing two uniform cutting edges and which employs abrading stones mounted so as to describe alternating overlapping rotating cycles across the cutting end of a drill.

Another object of the invention is to provide a drill sharpener wherein the abrading stones, in addition to rotating in a harmonious alternating, overlapping rotating movement, also, during said rotating movement, intersect a master or common center axis or vertex, which axis or vertex is concentric with the axis of the drill being sharpened.

A further object of the invention is to provide a drill sharpener wherein the abrading stones employed are adjusted for permitting accurate setting thereof with relation to the end of the drill being sharpened so that two uniform cutting edges for the drill will be produced, said cutting edges having true cutting and clearing edge characteristics.

A still further object is to provide a drill sharpener of this nature employing a guide for effectively guiding a drill being sharpened to proper position, said guide being adjustably mounted within the throat of the bridge employed so that the depth of said guide may be effectually regulated.

As a still further object, the invention seeks to provide a drill sharpener wherein the abrading stones are mounted on hinge members, which hinge members are interconnected by means of interfitting hinge yokes on a common shaft and which hinge members and yokes cooperate for mounting the weaver or planetary gear mechanism employed in an effective fool-proof manner.

A further object of the invention is to provide means for permitting free movement of the hinge members and means for adjustably locating said hinge members and hinge yokes carried thereby to various operative positions.

And the invention has as a still further object to provide a drill sharpener having a weaver or planetary gear mechanism which will travel in a stationary ring gear for permitting the proper planetary movement of the abrading stones employed.

Other and incidental objects of the invention not heretofore mentioned will become apparent during the course of the following description.

My invention is illustrated in the several sheets of drawings forming a part of this application.

In said drawings:

Figure 1 is a side elevation showing my improved drill sharpener as it would appear mounted on the edge of a table or the like and in an operative position.

Figure 2 is a side elevation showing my improved drill sharpener mounted in vertical position to receive a twist drill or the like which is mounted in a vertically disposed chuck.

Figure 3 is a vertical sectional view of the device on the lines 3—3 of Figures 1 and 4, looking in the direction indicated by the arrows.

Figure 4 is a vertical sectional view on the line 4—4 of Figure 3, looking in the direction indicated by the arrows.

Figure 5 is a detail plan view showing the manner of mounting the hinge members and hinge yokes with the abrading stones thereon on the inner frame or bridge employed.

Figure 6 is a transverse sectional view on the line 6—6 of Figure 5, looking in the direction indicated by the arrows.

Figure 7 is a detail sectional view on the line 7—7 of Figure 4.

Figure 8 is a transverse sectional view on the line 8—8 of Figure 2.

Figure 9 is a detail transverse sectional view on the line 9—9 of Figure 2, looking in the direction indicated by the arrows.

Figure 10 is a diagrammatic view showing the relation of the various vertices and axes on which certain of the rotating parts operate.

Figure 11 is a diagrammatic top view showing the abrading stones as they would appear with one of said stones in operative position and the other of said stones in inoperative position.

Figure 12 is a diagrammatic top view showing both of the abrading stones in the same relative position.

Figure 13 is a diagrammatic top view showing the abrading stones as they would appear in position reversed from that shown in Figure 11.

Figure 14 is a diagrammatic side view showing, by means of small triangles representing shafts at right angles to the main axis or vertex, the relation and position of said shafts or right angularly disposed axes to the main axis or vertex.

Figure 15 is a diagrammatic top view of the subject matter shown in Figure 14.

Figure 16:
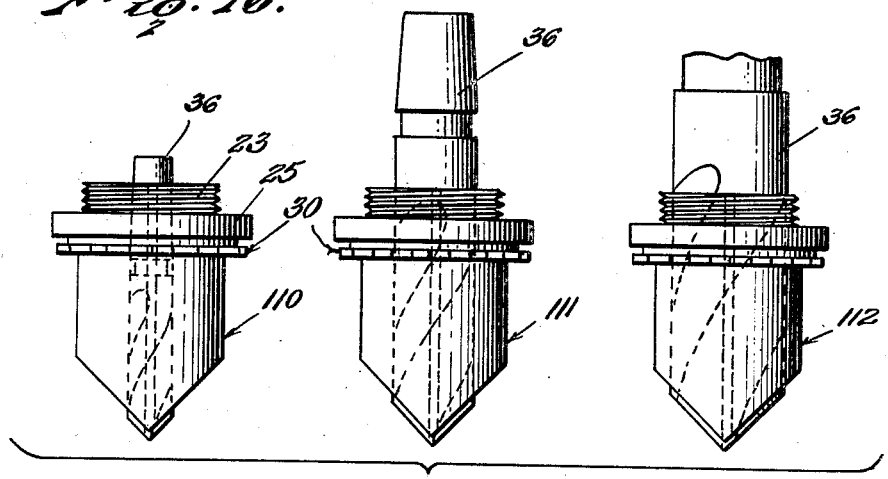
Figure 16 is a side elevation showing a plurality of guides which are of uniform exterior diameter but are adapted to receive drills of different sizes.

Referring now more particularly to the drawings, wherein, as will be seen, similar reference numerals designate like parts throughout the various views, the numeral 1 indicates in general the casing of my improved drill sharpener. The casing is preferably circular in shape and is provided with a relatively large inner end portion 2. The casing is reduced in diameter substantially above its mid-portion to form an intermediate portion 3 and said casing is further reduced above said midportion to define a neck 4. The inner portion 2, as best seen in Figures 1 and 2, has a mounting plate 5 which surrounds substantially half the circumference of the casing at said inner portion and is secured thereto by means of screws 6. The mounting plate 5 has an integral mounting pin 7.

As shown in Figure 1 of the drawings, my improved drill sharpener may be mounted horizontally by engaging the pin 7 in a suitable bracket 8 which is appropriately secured to the edge of a table or bench 9. The bracket 8 will be capable of rigidly holding the casing so as to prevent movement thereof with the pin 7. Formed in the intermediate portion 3 of the casing 1 are slots 10 which extend laterally with respect to the length of the casing and are adapted to permit entry of suitable tools for the adjustment of certain parts of the invention to be described hereinafter. The casing as closed at its larger or rear end by means of a removable rear wall 11 which is held in place on the casing 1 by means of mounting screws 12. By referring to Figures 3 and 4 of the drawings, it will be seen that the inner portion 2 is thickened at 13 to receive the mounting screws 12. Formed axially in the removable rear wall 11 is a bearing 14. Carried at the other end of the casing 1 and screwed into the neck 4 is a closure ring 15 which is of substantially inverted step shape in cross section and which is held against accidental displacement from the neck 4 by means of a locking bolt 16. The closure ring defines a bearing.

Rotatably mounted in the casing 1 and adapted to extend throughout the major portion of the length of said casing is an inner frame or bridge 17 which is provided with a neck portion 18 rotatably mounted in the closure ring 15. Said neck portion 18 defines a shoulder 19 which engages the under side of the stepped surface of the closure ring so that said closure ring cooperates with the shoulder to prevent accidental upward displacement of the inner frame in the casing. The inner frame 17 is provided with mounting portions 20 and 21 and said neck portion is formed with an axial opening 22, which opening extends throughout the length of said neck portion.

The neck portion 18 of the frame 17 is adapted to removably receive in the axial opening 22 a tubular or sleeve-shaped guide 23 which is provided throughout the outer half of its length with threads 24. An adjusting ring 25 is screwed on the threads 24 of the guide 23 and has a reduced inner ring portion 26 provided with spanner teeth 27. As clearly seen in Figures 1, 2, 3 and 4 of the drawings, the inner ring portion 26 is adapted to be associated in close spaced relation with the upper end of the neck portion 18 of the inner frame or bridge 17. The upper end of said neck portion 18 is formed with an annular slot 28 which defines a rim 29 of the same thickness and cross sectional contour as the inner ring portion 26. As best seen in Figures 1, 2, 3 and 9, there is provided a locking fork 30 which is formed with a handle portion 31 and arcuate channel-shaped legs 32. The edge portions 33 defining said channel-shaped legs are adapted to straddle the inner ring portion 26 and the rim 29 so as to retain the adjusting ring 25 in proper relation to the upper end of the inner frame or bridge 17. Inwardly of the handle portion 31 of the locking fork 30 and integral with said handle portion is a locking tooth 34 which is adapted to engage certain of the spanner teeth for holding the adjusting ring 25 and the rim 29 against relative rotative movement.

By referring to Figure 8 of the drawings, it will be clearly seen that the guide 23 is provided with curved guideways 35 which are adapted to receive and tightly hold against rotative movement in said guide, a drill 36 to be sharpened. The drill may, as heretofore stated, be of the steel twist drill type or may be merely a straight drill, although it should be understood that I do not limit myself in any way as to the particular type of drill which may be sharpened as it will be readily seen that my invention may be adapted for sharpening various types of drills. The guide 23, with the drill 36 therein, is raised and lowered in the casing by means of the adjusting ring 25 which is screwed on the threads 24 of the guide. The depth of the guide is controlled by the fork 30 so that easy control will be provided.

The inner frame 17 is formed, beneath the mounting portions 20 and 21, with straight walls 37 and 38 and the frame is provided with a common bottom wall 39 which connects the lower end portions of the walls 37 and 38. The wall 39 is formed with a depending stud 40. The depending stud is adapted to be rotatably mounted in the hub 41 of a base driving gear 42. The base driving gear extends throughout the lower or inner portion of the casing 1 and is provided with an outwardly inclined wall 43 formed with beveled teeth 44. Interposed between the base driving gear 42 and the removable rear wall 11, and surrounding the hub 41 in close relation thereto is a check spring 45 which engages the gear and limits said gear to unidirectional rotation.

The common bottom wall 39 has upstanding mounting arms 46 and 47 which are disposed in parallel spaced relation to each other and to the straight walls 37 and 38. The upstanding mounting arms cooperate with their associated straight walls to define yokes 48 and 49 and a space 50 between said yokes. In other words, the straight wall 37 and the upstanding mounting arm 46 cooperate to form one yoke while the straight wall 38 cooperates with the mount-arm 47 to define the other mounting yoke. Extending transversely through the walls 37 and 38 and terminating adjacent the outer surfaces of the upstanding arms 46 and 47 respectively, are bushing sleeves 51 and 52 which have integral flanges 53 and 54 having screws 55 extending therethrough for securing said bushing sleeves in place on the straight walls 37 and 38. The bushing sleeves are adapted to provide a journal for stub drive shafts 56 and 57 which are provided at their respective outer ends with beveled gears 58 and 59 adapted to mesh with the teeth 44 of the base driving gear 42. The shafts 56 and 57 are provided at their corresponding inner ends and within the space 50 with driving pinions 60 and 61 which, as will be seen by referring to Figures 3 and 6 of the drawings, are disposed in parallel spaced relation to each other in said space 50. The beveled gears 58 and 59 are adapted to be rotated by said base driving gear 42 for transmitting rotative movement to the driving pinions 60 and 61. The base driving gear 42 is adapted to be rotated by means of a handle indicated in general at 62. The handle includes a threaded shank 63, which is screwed into the hub 41, and a body portion 64, said body portion having a handle member 65 which is manually engageable for permitting turning of the handle, the base driving gear, the gears 58 and 59, and the driving pinions 60 and 61.

As best seen in Figures 3 and 6 of the drawings, the mounting portions 20 and 21 of the inner frame 17 are thickened toward their lower ends and are reduced to define adjusting blocks 66 and 67 which are provided with internally threaded openings 68.

Hingedly mounted on the bushing sleeves 51 and 52 within the yokes 48 and 49 respectively, are abrading stone units 69 and 70 which are, as seen in Figure 6, obliquely disposed with respect to the axes of the stub shafts 56 and 57. The abrading stone unit 69 is formed with spaced hinge ears 71 and 72, the hinge ear 71 journaling the outer portion of the bushing sleeve 51 while the ear 72 journals the inner end portion of the bushing sleeve 52. The abrading stone unit 70 carries hinge ears 73 and 74, the ear 73 being disposed in parallel close relation to the ear 71 while the ear 74 is disposed in like relation to the ear 72. The abrading stone unit 69 is provided, adjacent the hinge ear 71, with an adjusting bolt opening 75 while the abrading stone unit 70 is provided adjacent the ear 74 with an adjusting bolt 76. It will be understood that the abrading stone units will be adapted to swing toward and away from each other on the bushing sleeves 51 and 52. However, an adjusting bolt, such as shown at 77 in full lines in Figure 3, and in dotted lines in Figure 4, is passed through each of the openings 75 and 76 and into the threaded adjusting blocks 66 and 67 respectively. Tightening or loosening of the adjusting bolts will serve to move the units 69 and 70 toward or away from each other about a pivot defined by the bushing sleeves 51 and 52.

Formed in the abrading stone units 69 and 70 are circular openings 78 and 79 which are adapted to receive abrading stone mechanism to be described presently. The abrading stone mechanism in each unit is of identical construction but in order that the proper relationship between the units may always be kept in mind the mechanism of both of said units will be described together.

Rotatably mounted in the openings 78 and 79 are circular mounting blocks 80 and 81 which are adapted to carry threaded upper end portions 82 and 83. The threaded upper end portions are adapted to have screwed thereon bearing rings 84 and 85 held in place by locking rings 86. The blocks are formed with flanges 87 which define bearing races 88 adapted to receive ball bearings 89. It will be understood that the circular mounting blocks will be effectively rotatably mounted in the openings 78 and 79. The openings 78 and 79 have shoulders 87 formed therein and said shoulders are adapted to receive a circular ring gear 88 held against rotation on the shoulders and in the abrading stone units 69 and 70 by means of keys 89. The circular mounting blocks 80 and 81, as best seen in Figure 7 of the drawings, are provided with recesses 90 and 91 which receive rotatably therein pinions 92, which pinions are mounted on axis bolts 94, which bolts extend eccentrically into the circular mounting blocks. The relatively long axis bolts 94 cooperate with assembly bolts 95 for effectually securing a spiral gear 96 to each of the mounting blocks so that each mounting block will turn with each spiral gear as a unit. The spiral gears 96 are adapted to mesh with the spiral gears 60 and 61 which are mounted on the stub drive shafts 56 and 57. That is to say, in view of the fact that the units 69 and 70 are disposed slightly obliquely with respect to the longitudinal axes of the stub drive shafts, one of the spiral gears 96 will be caused to mesh with the gear 60 while the other of said spiral gears 96 will be caused to mesh with the gear 61. One stub drive shaft will, therefore, transmit rotative movement to the circular mounting block 80 while the other of said stub drive shafts will transmit rotative movement to the circular mounting block 81.

Formed in the circular mounting blocks eccentrically thereof, are recesses 97, and extending through said recesses axially thereof and through the mounting blocks are stone mounting shafts 98. The stone mounting shafts are threaded at their upper ends, as shown at 99, and have screwed thereon bearing rings 100 held in place by means of locking rings 101. Ball bearings 102 are located in the recesses between the rings 100 and the shoulders of said recesses, and said ball bearings cooperate with the rings and recesses for providing smooth running bearings for the forward ends of the stone mounting shafts 98. Keys 103 serve to lock the bearing rings 100 and the shafts 98 against relative rotative movement. The corresponding outer ends of the stone mounting shafts 98 are journaled by bearings 104 which are formed on cup-shaped housings 105 adapted to overlie the outer surfaces of the spiral gears 96. Fixed to rotate on the upper or outer corresponding ends of the stone mounting shafts 98 are substantially frusto conical abrading stones 106 and 107. Mounted on the shafts 98 within the recesses 91 in the circular mounting blocks and keyed to said shafts are pinions 108 and 109 which are adapted to mesh with the pinions 92. The pinions 92, of course, mesh with the teeth of the ring gear 88. The shafts 98 are threaded at their inner or lower ends, as shown at 98a, and said threaded portions have screwed thereon locking nuts 98b.

In operation, the drill to be sharpened is, as shown in Figures 1, 2 and 4 of the drawings, first placed in the guide 23. The drill will be held against rotation in the guide. The adjusting bolts 77 are shifted for positioning the abrading stones 106 and 107 in proper angular relation in engagement with the cutting surfaces of the drill to be sharpened. The handle 62 is then rotated for transmitting rotative movement from the gear 42 to the beveled gears 58 and 59 and thence through the shafts 56 and 57 to the driving pinions 60 and 61. From the driving pinions, rotative movement is transmitted respectively to the spiral gears 96 carried by the circular mounting blocks 80 and 81. As the circular mounting blocks rotate within the abrading stone units, the pinions 92 will transmit rotative movement to the pinions 108 and 109 for rotating the stone mounting shafts 98 and the stones thereon for effecting the sharpening operation. As the stones rotate, due to the fact that I employ the pinions 92 and 108 and 109, they will be caused to be moved in harmonious, alternating, overlapping, planetary cycles across the cutting surfaces of the drill for effectively sharpening the drill.

In the form of the invention shown in Figure 2, the handle is not employed and the base will be maintained stationary by means of the integral mounting pin 7. This form of the invention is to be employed where a breast drill in a vertical chuck is to be sharpened. In both forms of the invention, the check spring member 45 will cooperate with a like check spring member 110 for limiting the rotating parts to unidirectional movement.

Referring now to the diagrammatic views and particularly to Figure 10 of the drawings, this view shows the diagrammatic relation of the various parts. For example, the numerals 111, 112, 113, and 114 indicate the approximate elevations for the variable adjusting ring 25 and locking fork 30 and the closure ring or bearing 15, which bearing 15 is, of course, adjustable. The numeral 115 indicates the approximate elevation or point where the working faces of the stones 106 and 107 pass through the master axis or vertex which is coincidental with that of the drill being sharpened. The lines 116 and 117 are drawn to indicate diagrammatically the relative positions of the stone mounting shafts 98 to each other. Figures 11, 12 and 13 illustrate diagrammatically the various operative positions of the stones and show clearly that when one of said stones moves inwardly across the axis of the drill or master vertex, the other of said stones will move away from said master vertex and vice versa. Figure 14 is a view of the same general type as Figure 10 but shows, at 119, the axes of the stub drive shafts 56 and 57 as well as a line 120 indicating the base elevation. The axes 119 and the base elevation 120 will serve to cooperate with the other lines for indicating the proper relation of the various axes. It is thought that these diagrammatic views will be of aid in ascertaining the relationship of the axes of the various shafts to each other. Figure 15 is, of course, a top view of the diagrammatic matter shown in Figure 14.

As seen in Figure 16 of the drawings, the drill guides, which are shown at 110, 111, 112, are of uniform exterior dimensions but are adapted to receive drills of different sizes. In other words, a drill guide may be provided for each size of drill to be sharpened and all that it is necessary to do is to place the desired guide in position to receive said drill.

Figure 17:
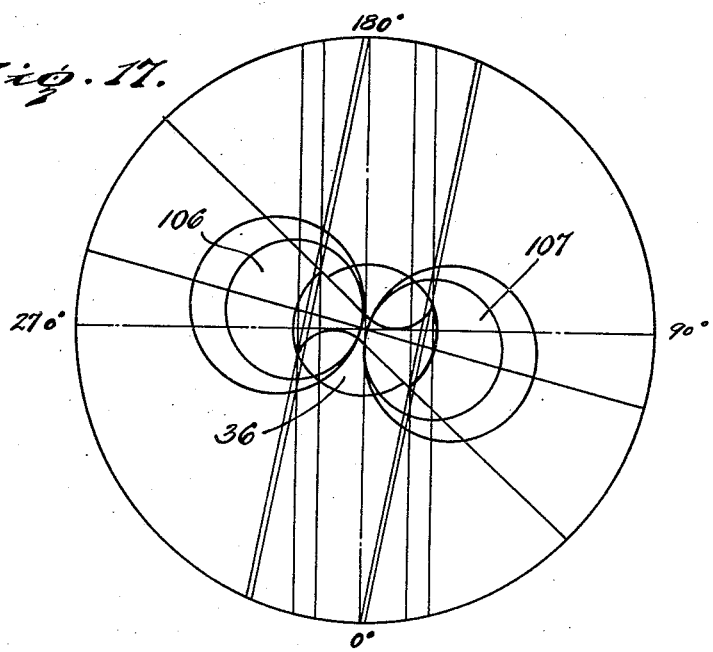
Figure 17 is a diagrammatic view showing the relation between the cutting edges and rakes of the drill and the abrading stones and particularly showing the various relative angles.

In Figure 17 of the drawings, there will be seen a diagrammatic view showing in top plan the relative positions and angles between the rakes and cutting edges of a drill and the abrading stones. It should be understood that the stones are so positioned as to cooperate with the cutting edges of the drill for effecting the most efficient sharpening of said edges. It should be further understood that the abrading stones may be shifted to suit individual conditions and, moreover, said stones may be interchanged when necessary. That is to say, by shifting the stones farther apart, or nearer a one hundred and eighty degree angle with respect to each other, larger stones will be required to effect the sharpening of the end of the drill. A different angle of cutting edge will, however, be provided. There is no limit to the flexibility of the device in that any suitable angle between the stones and any desired size of stones may be employed. The flexibility of the device is only limited by its mechanical dimensions but it is safe to say that any reasonable angle between the stones may be assumed for providing practically any suitable angle or cutting edge desired.

It is believed that the construction and operation of my improved automatic drill sharpener will be thoroughly understood from the foregoing description so that further explanation is deemed unnecessary.

Having thus described the invention, what I claim is:

1. In a drill sharpener, a casing, an inner frame rotatable in the casing, a guide carried by the inner frame for supporting a drill to be sharpened, abrading means, means rotatably mounting the abrading means on the inner frame in a position to engage the drill to be sharpened, means for rotating the abrading means and sharpening the drill, and an adjusting ring carried on the guide and the inner frame and being operative for shifting the position of the drill relative to said abrading means.

2. In a drill sharpener, means mounting a drill to be sharpened, sharpening means, means mounting said sharpening means in position for a drill sharpening operation, means for rotating said sharpening means and effecting the sharpening of the drill, and means for moving the sharpening means eccentrically in alternating overlapping planetary cycles alternately intersecting the axis of the drill during the sharpening operation whereby uniform grinding of the cutting edges of said drill will take place.

3. In a drill sharpener, a casing, an inner frame rotatably mounted in the casing, a guide carried by the inner frame and having guideways, said guide and guideways being adapted to hold against rotation a drill to be sharpened, abrading stone units carried by the inner frame, abrading stones carried thereby and being adapted to engage the end of the drill, means carried by the units and said inner frame for rotating the stones and simultaneously moving said stones across the end of the drill eccentrically in overlapping planetary cycles alternately intersecting the axis of the drill, and means for rotating said last mentioned means.

4. In a drill sharpener, a casing, an inner frame rotatably mounted in the casing, a guide carried by the inner frame and having guideways, said guide and guideways being adapted to hold against rotation a drill to be sharpened, means permitting vertical adjustment of the guide, abrading stone units carried by the inner frame, abrading stones carried by said units and being adapted to engage the end of the drill, planetary gearing carried by the units, gearing carried by the inner frame and adapted to mesh with said planetary gearing for effecting rotation of the abrading stones, and means engageable with said last mentioned gearing for causing rotation of all of said gearing and said stones and simultaneously moving said stones eccentrically across the cutting surfaces of the drill in overlapping planetary cycles intersecting the axis of the drill whereby said cutting surfaces will be uniformly sharpened.

5. In a drill sharpener, a casing, an inner frame rotatably mounted in the casing, means limiting said inner frame to unidirectional rotative movement, means carried by the casing and adjustably mounting therein a drill to be sharpened, abrading stone units hingedly connected with the inner frame, abrading stones carried by said units, means carried by said abrading stone units and said frame and being adjustable for permitting adjustments in the setting of said abrading stone units with respect to the cutting surfaces of a drill, ring gears carried by the abrading stone units, circular mounting blocks, abrading stones carried by said blocks, pinions carried by said blocks, a shaft connecting certain of said pinions with the abrading stones, spiral gears carried by the mounting blocks, means carried by the inner frame and engageable with the spiral gears for transmitting rotative movement to the stones whereby said stones will be caused to rotate and simultaneously move eccentrically across the cutting surfaces of the drill in overlapping planetary cycles intersecting the axis of the drill, and means limiting said last mentioned means to unidirectional rotation.

6. In a drill sharpener, a casing, means for supporting the casing on a surface, means for supporting in the casing a drill to be sharpened, rotatable sharpening means in the casing and being adapted for grinding the cutting surfaces of the drill, and a handle carried by the casing for rotating said last mentioned means for effecting a sharpening operation, said rotatable sharpening means comprising rotatable stones adjustable for varying the included angle between the end surfaces of said stones at the axis of the drill whereby the cutting surfaces of the drill may be ground to suit varying conditions.

7. In a drill sharpener, a casing, means for supporting the casing on a surface, means for supporting in the casing a drill to be sharpened, rotatable sharpening means in the casing and being adapted to engage the cutting surfaces of the drill, and a handle carried by the casing and being adapted to rotate said last mentioned means for effecting a sharpening operation, and means for shifting said rotatable sharpening means to move simultaneously in eccentric cycles obliquely to the axis of the drill and alternately to overlap said axis.

8. In a drill sharpener, a casing, an inner frame in the casing, means mounting the inner frame in the casing, means limiting the frame to unidirectional rotation in the casing, a guide carried by the frame and being adapted to retain a drill to be sharpened in position, abrading stone units hingedly connected with the inner frame, abrading stones carried by said units, means for adjusting said units to permit proper angular disposition of said stones to engage the cutting surfaces of the drill, a base driving gear, means rotatably connecting said driving gear with the stones, and means for rotating said driving gear and last mentioned means for imparting rotative and eccentric movement to said stones whereby said stones will be caused to sharpen the drill.

9. In a drill sharpener, a casing having a rear wall having a bearing, a driving gear rotatable in the bearing and having a hub, a handle for rotating the driving gear, a closure ring at the opposite end of the casing defining a bearing, an inner frame having a neck portion journaled by the closure ring and a depending lug journaled by the hub, a guide carried by the neck portion and being adapted to receive a drill to be sharpened, means carried by the neck portion and casing for adjusting the guide in said neck portion, means carried by the closure ring for limiting said inner frame to unidirectional rotation, means about the driving gear hub for limiting said driving gear to unidirectional rotation, an abrading stone unit, a bushing sleeve hingedly mounting the abrading stone unit on the inner frame, a stub drive shaft, a circular mounting block, a stone mounting shaft, an abrading stone carried thereby and adapted to be engaged with the drill, and gearing carried by said unit and said stub drive shaft and being adapted to cooperate with the driving gear for imparting a rotative eccentric sharpening motion to the stone for effecting the sharpening of the drill.

10. In a drill sharpener, a casing, an abrading stone unit in the casing and having an opening, a circular mounting block rotatably carried in the opening and having recesses, a spiral gear carried by the mounting block, a ring gear carried by the unit adjacent the opening, means limiting said ring gear against rotation relative to the unit, a pinion in one of said recesses and meshing with the ring gear, means rotatably mounting the pinion in the recess, a stone mounting shaft, means carried by the mounting block and journaling one end of the shaft, an abrading stone carried by said shaft, a pinion carried by said shaft and being adapted to mesh with said first mentioned pinion, and means carried in the casing and operatively engageable with the spiral gear for rotating said spiral gear whereby rotative movement will be transmitted through the pinions to the stone mounting shaft and stone for causing said stone to rotate on its own axis and eccentrically relatively to the opening in the unit, said stone being adapted for uniformly grinding the sharpening surface of a drill held in the casing.

11. In a drill sharpener, a casing, a closure ring closing the casing at one end and defining a bearing, an inner frame carried by the casing and journaled at one end by said bearing, means within the casing journaling the opposite end of said inner frame, said frame having a neck portion provided with a rim and an axial opening, a guide carried in said axial opening and having external threads, an adjusting ring carried by said guide on said threads and having an inner ring portion formed with spanner teeth, a locking fork having arcuate channel shaped legs straddling the rim and said inner ring portion, said locking fork having a locking tooth engageable with one of said spanner teeth and said locking fork being adaptable for regulating the depth of the guide whereby the position of a drill to be sharpened and carried in the guide may be regulated, and means in the casing engageable with the cutting surfaces of the drill for sharpening said surfaces.

12. In a drill sharpener, a casing having a removable inner wall provided with a bearing, a closure ring closing the casing at its opposite end, an inner frame rotatably mounted in the casing and having one end journaled by said closure ring, a base driving gear carried in the casing and having a hub journaled by said bearing, said inner frame having upstanding mounting arms and a common bottom wall, said common bottom wall being provided with a depending lug journaled by said hub to form a bearing for the inner end of said inner frame, said upstanding mounting arms cooperating with side portions of the inner frame to define yokes, bushing sleeves carried by the side portions of the inner frame and extending to the upstanding arms, abrading stone units carried by the inner frame and having hinge ears swingingly mounted on said bushing sleeves, stub drive shafts carried in the bushing sleeves, beveled gears carried by said stub drive shafts, said beveled gears being adapted to mesh with said base driving gear, driving pinions carried by said stub drive shafts, circular mounting blocks rotatably mounted in the abrading stone units, spiral gears carried by said circular mounting blocks and being adapted to mesh with said first mentioned spiral gears, one of said spiral gears on one mounting block being adapted to mesh with one of the spiral gears on one of said stub driving shafts and the other of said spiral gears on the other of said circular mounting blocks being adapted to mesh with the other spiral gear on the other of said stub driving shafts, said mounting blocks having recesses, pinions carried in the recesses, ring gears fixed to the abrading stone units and being adapted to mesh with the pinions, stone mounting shafts journaled in the circular mounting blocks and having pinions meshing with said first mentioned pinions, abrading stones carried by said stone mounting shafts and being adapted to engage a drill in the case for sharpening said drill, all of said gears being adapted to transfer rotative movement to the abrading stones, said abrading stones being adapted to rotate on their axes and being adapted to move eccentrically within the abrading stone units whereby they will be caused alternately to overlap and intersect the axis of the drill being sharpened.

13. In a drill sharpener, a casing, an inner wall closing the casing at one end, a closure ring closing the casing at the other end and defining a bearing, an inner frame having one end journaled by said closure ring, means carried at the other end of said casing for journaling the other end of said inner frame, said closure ring being adjustable for retaining the inner frame properly rotatably mounted in the casing, means carried by the casing for retaining the closure ring in an adjusted position, means limiting the inner frame to unidirectional rotation, a guide carried by the inner frame and having guideways for receiving a drill to be sharpened, means carried by the guide and said inner frame for regulating the depth of said guide within the casing, and means carried by the inner frame and engageable with cutting surfaces of the drill and being rotatable and having simultaneous planetary overlapping movement intersecting the axis of the drill for sharpening said drill.

GEORGE W. FINKE.